Figure 1:
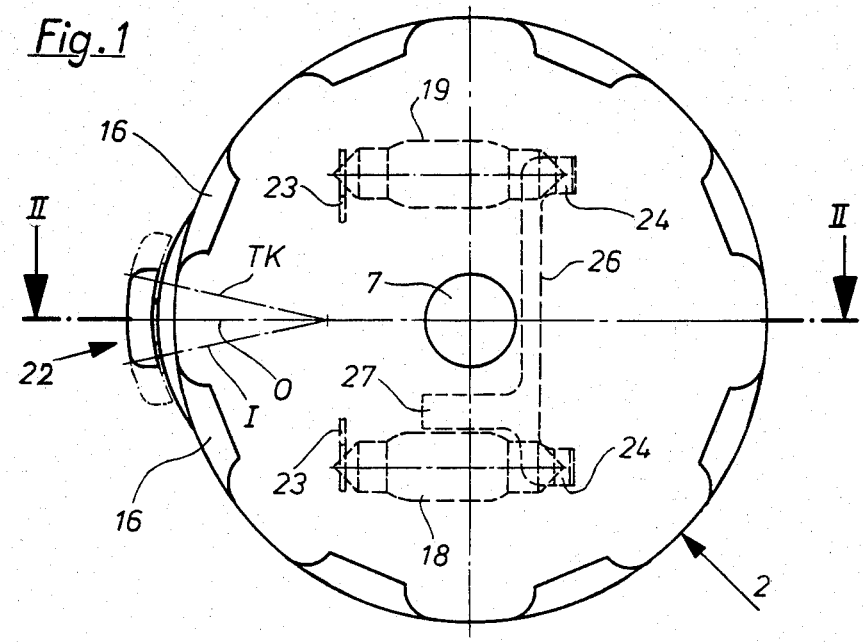

United States Patent [19]

Grimm et al.

[11] Patent Number: 4,536,829

[45] Date of Patent: Aug. 20, 1985

[54] HAND ACTUATING ELEMENT FOR ADJUSTMENT DRIVES ON AUTOMOBILES

[75] Inventors: Rainer Grimm, Wetzlar; Adolf Elfen, Bingen-Bingerbrück, both of Fed. Rep. of Germany

[73] Assignees: Rockwell-Golde G.m.b.H.; Franz Kirsten Electrotechnische Spezialfabrik, both of Fed. Rep. of Germany

[21] Appl. No.: 561,857

[22] Filed: Dec. 15, 1983

[30] Foreign Application Priority Data

Dec. 18, 1982 [DE] Fed. Rep. of Germany ....... 3246985

[51] Int. Cl.³ ............................................... B60Q 3/02
[52] U.S. Cl. ......................................... 362/74; 362/80; 362/251; 362/368; 362/408; 362/276; 362/240
[58] Field of Search ............... 296/215; 362/61, 74, 362/80, 368, 375, 408, 276, 240, 251

[56] References Cited

U.S. PATENT DOCUMENTS

| 2,173,890 | 9/1939 | Tuttle | 296/215 |
|---|---|---|---|
| 2,581,185 | 1/1952 | Gordon | 362/253 X |
| 2,760,050 | 8/1956 | Porsche | 362/80 |
| 2,920,186 | 1/1960 | Timoff et al. | 362/253 X |
| 3,156,415 | 11/1964 | Walker | 362/74 |
| 3,377,452 | 4/1968 | Bock et al. | 362/253 X |
| 3,979,148 | 9/1976 | Martin | 296/215 |
| 4,142,227 | 2/1979 | Aikens | 362/74 |
| 4,161,336 | 7/1979 | Le Van et al. | 296/218 |

FOREIGN PATENT DOCUMENTS

| 567032 | 12/1958 | Canada | 362/74 |
|---|---|---|---|
| 41783 | 10/1965 | German Democratic Rep. | 362/74 |
| 58-4627 | 1/1983 | Japan | 296/215 |

*Primary Examiner*—Peter A. Nelson

[57] ABSTRACT

In a rotatable hand actuating element for adjustment drives on automobiles, especially a handwheel assembly for actuation of a sliding roof, consisting of a handwheel (2) and a mounting plate (1) on which the handwheel is rotatably journalled, at least one incandescent lamp (18) is housed in addition to the drive components in the internal space (17) of the handwheel, the light from which lamp passes out through at least one translucent wall surface of the handwheel. As a result the handwheel assembly also becomes the lighting fixture for the automobile interior illumination, with the result that additional lighting fixtures are rendered unnecessary. On the mounting plate, a switch (21) for the incandescent lamp or lamps may be mounted which, starting from a neutral position, can be switched as desired into a switched-on position or possibly a door contact position.

16 Claims, 9 Drawing Figures

_Fig. 8_
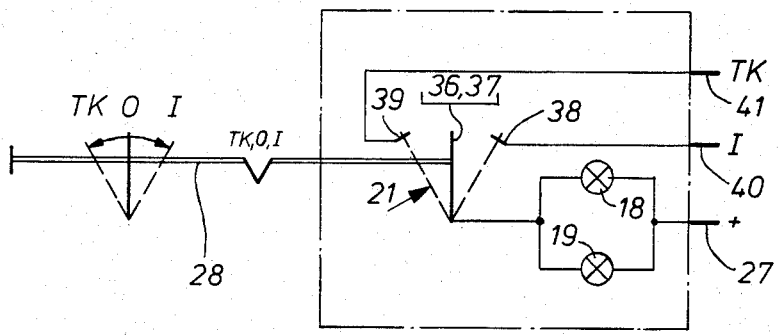
_Fig. 9_
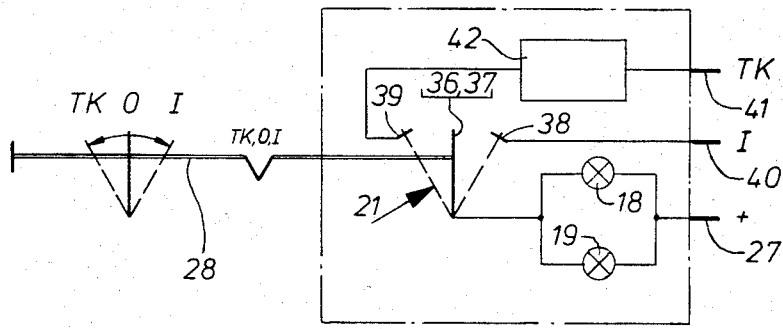

HAND ACTUATING ELEMENT FOR ADJUSTMENT DRIVES ON AUTOMOBILES

This invention relates to a rotatable hand actuating element for adjustment drives on automobiles, especially a handwheel assembly for sliding roof actuation, consisting of a shell-shaped handwheel furnished with a peripheral rim and an internally located, central bearing sleeve and of a mounting plate, towards which the open side of the handwheel faces, and which rotatably journals the handwheel by means of a bearing journal penetrating into the bearing sleeve, an external set of teeth situated on the bearing sleeve being in engagement with a gearwheel rotatably mounted on the mounting plate, which (gearwheel) is connected in rotationally keyed manner with a drive pinion for drive elements transmitting the adjustment movement.

Hand actuating elements for, for example, automobile ventilating devices, are known in various forms of embodiment, including those with optionally folding cranks mounted thereon. A common feature of all hand actuating elements is that they are provided exclusively for the purpose of actuating drive elements which transmit the desired adjustment movements to the associated ventilating device, for example the sliding lid of a sliding roof construction or a sliding window or a seat fitting. In order to associate with a hand actuating element a further function, it is proposed according to the present invention, starting from the initially designated category, that the handwheel shall possess at least one wall surface translucent to light, opposite to which at least one incandescent lamp is situated, mounted in the internal space of the handwheel between the handwheel and the mounting plate.

According to the basic concept of the invention, the hand actuating element and the lighting fixtures which otherwise would have to be provided separately in the internal space of the automobile are combined into one unit to be jointly installed, thus leading to a reduction in manufacturing and installation costs. Furthermore, the omission of separate lighting fixtures permits, in the forward fixed roof region and/or at the so-called B columns of the automobile bodywork, a smoother surface form of these zones. The invention is not limited to its use on handwheel assemblies. It can also be applied to crank assemblies, if the crank foot is dimensioned and constructed appropriately.

For adequate internal illumination of the automobile, it may be completely sufficient if only one translucent wall surface is provided on the handwheel, which permits light to pass out in the manner of a window. Preferably, however, the arrangement is such that the handwheel as a whole is moulded from a translucent material, for example a suitable plastics. In this form of embodiment the handwheel itself with all its visible surfaces serves as the lighting fixture, with the result that excellent illumination of the entire internal space of the automobile is achieved.

If the emission of a diffuse light is desired, it is advantageous if the translucent wall surface or the handwheel be made from a plastics material rendered opaque. A corresponding diffusion and scattering effect can be achieved if the translucent wall surface or handwheel is equipped with scattering prisms or the like, which favourably may be mounted on or moulded into the inner face. The two measures may also be used in combination.

In pursuance of the concept of this invention, the hand actuating element may be so constructed that a switch for the incandescent lamp or lamps is mounted on the mounting plate. This switch can advantageously project with its actuating element beyond the circumference of the handwheel and possess, in known manner a neutral position, a switched-on position and a door contact position, each with locating engagement. On the basis of this form of embodiment, the hand actuating element constructed as a lighting fixture can be operated in the same manner as a conventional lighting fixture for automobile interior illumination.

With advantage, the arrangement is such that the switch is diametrally opposite, in respect of the handwheel, to the gearwheel, and that one incandescent lamp each is provided in symmetrical arrangement on either side of the central plane oriented perpendicularly to the mounting plate and passing through the switch, bearing sleeve and gearwheel. With this arrangement, inside the handwheel internal space, the functional components of the drive and illumination are so arranged that seating spaces for two incandescent lamps are available, one on either side of the aforementioned central plane, thus resulting in improved illumination.

Tubular or strip lamps, which are held in known manner between contact clips mounted electrically insulated on the mounting plate, are advantageously used as incandescent lamps. It is advantageous if the mounting plate is moulded from an electrically nonconducting plastics material, and if the fixed switch contacts and the contact clips for the incandescent lamps are fixed directly to the mounting plate and are connected with spade terminals for the cable connection.

In the interests of simple construction, it is envisaged that, where two incandescent lamps are provided, their contact clips are connected together in pairs by connecting strips formed in one piece with the contact clips. These connecting strips serve not only as conductor path but also assure a firm fixing of the contact clips to the mounting plate.

For a simple arrangement of the electrical components, it is furthermore advantageous if, at that connecting strip which is adjacent to the switch, two movable switch contacts spaced apart are provided, which can be brought by the actuating element as desired into electrically conducting contact each with one associated, fixed switch contact.

The actuating element itself is favourably formed as a lever, pivotal about a bearing pin oriented parallel to the bearing sleeve, the bearing pin of which lever, journalled on the mounting plate, is situated centrally between the two movable switch contacts.

The locating capability of the actuating element in the three different switch positions is achieved in a simple manner in that a detent tongue is mounted on the actuating element, which tongue is engaged as desired into one of three detent depressions situated alongside one another on the mounting plate, of which the central depression corresponds to the neutral position and the two lateral depressions are each associated with one switched position, in each of which one of the fixed switch contacts and one of the movable switch contacts are in electrically conducting contact.

In pursurance of the concept of this invention, the arrangement can be such that an already known electronic delay element, mounted on the mounting plate, is connected before the fixed switch contact associated with the door contact position of the actuating element. This delay element ensures, in the door contact switched position of the actuating element, that after the automobile door has closed the internal illumination is switched off with delay.

In order to improve the light distribution it is advantageous if the mounting plate is equipped, on its face towards the handwheel, at least in the region of the incandescent lamps with a good reflecting coating. A corresponding effect can, however, be achieved in a simple manner by the mounting plate as a whole being moulded from a light-coloured plastics material possessing a good light reflection coefficient.

Further details of the invention are explained in more detail below with reference to the drawings which illustrate examples of embodiment thereof.

Figure 2:
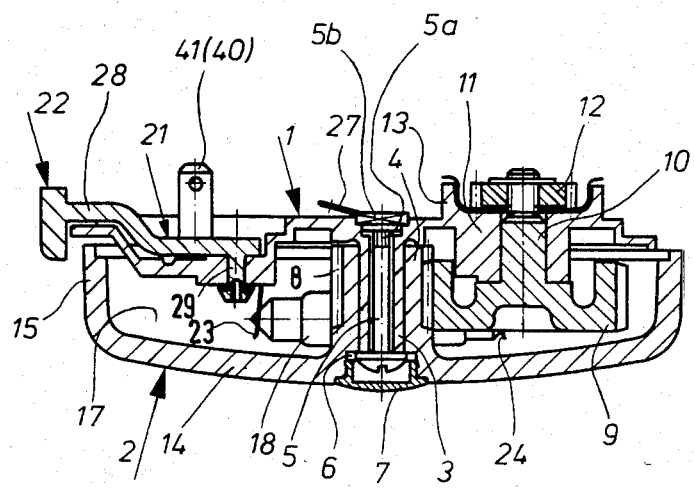
Figure 3:
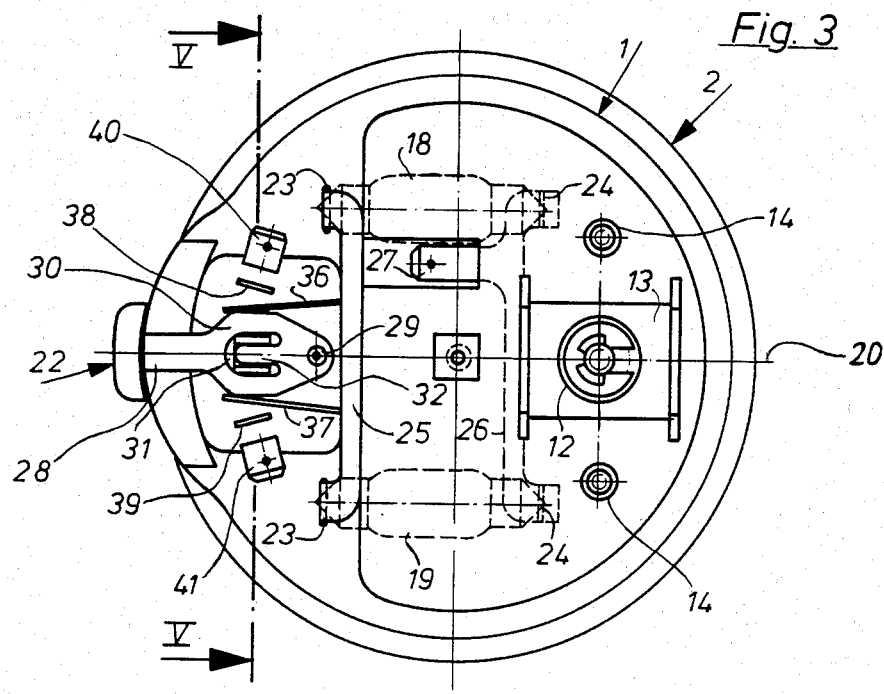
Figure 4:
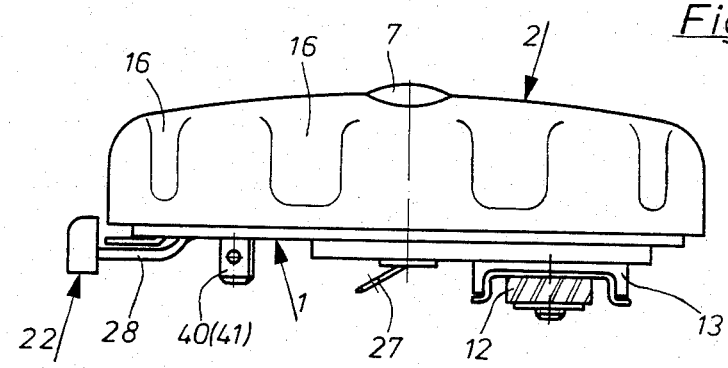
Figure 5:
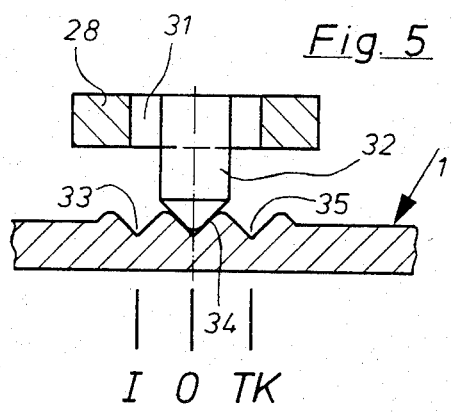
Figure 6:
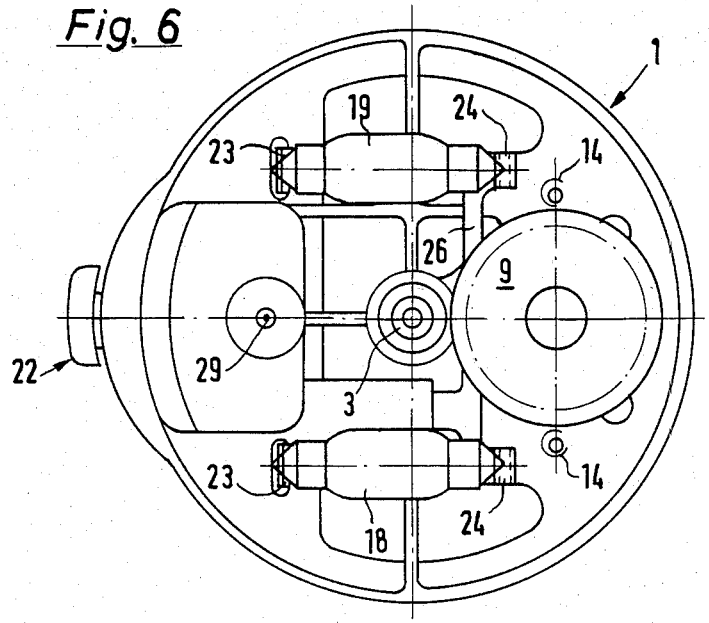
Figure 7:
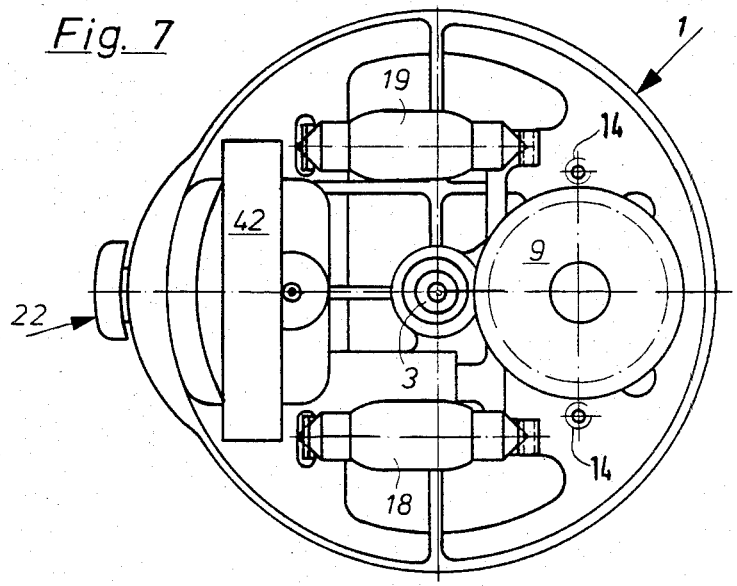

The drawings show:

FIG. 1 a plan on a handwheel assembly,

FIG. 2 a section through the assembly according to FIG. 1 along the line II—II,

FIG. 3 a view from below of the handwheel assembly,

FIG. 4 a side view of the assembly according to FIGS. 1 to 3,

FIG. 5 a cut-away, enlarged section along the line V—V in FIG. 3,

FIG. 6 a plan on the assembly, with the handwheel removed,

FIG. 7 a plan corresponding to FIG. 6, but with additionally fitted electronic delay element, FIG. 8 an electrical circuit diagram of the assembly shown in FIGS. 1 to 6 and FIG. 9 a modified circuit diagram comprising an electronic delay element.

For explaining the basic construction of the handwheel assembly, reference is first made to FIGS. 1 to 4. FIG. 2 illustrates the installed position of the handwheel assembly, when the latter is used for moving the sliding lid of a sliding roof construction. In this case the handwheel assembly is mounted in the forward, fixed roof region of the automobile bodywork, for example on the forward transverse component of the sliding roof frame surrounding the roof opening.

Important parts of the handwheel assembly are the mounting plate, referenced generally 1, and the handwheel, likewise generally referenced 2. The mounting plate 1, the construction of which will be explained in more detail during the course of this description, possesses a cylindrical bearing journal 3 projecting perpendicularly from it, which penetrates into a bearing sleeve 4, located centrally on the handwheel 2. The dimensions of the internal diameter of the bearing sleeve 4 and of the external diameter of the bearing journal 3 are so adapted to each other that a rotational mounting without play of the handwheel 2 on the mounting plate 1 is obtained. The axial lengths of the bearing journal 3 and bearing sleeve 4 are likewise adapted to each other in such a way that no notable axial play occurs when the handwheel 2 is fixed to the mounting plate 1 by a screw 5, the head of which is situated in a central depression 6 of the handwheel 2 and the threaded portion 5a of which engages into a corresponding insertion nut 5b, which is mounted on the mounting plate 1. The central depression 6 can be closed by a closure plug 7 after the screw 5 has been fitted.

The bearing sleeve 4 carries, extending around its periphery, an external set of teeth 8, which is permanently in engagement with a complementarily toothed gearwheel 9. The gearwheel 9 is rotatably journalled with a bearing projection 10, oriented parallel to the axis of the bearing journal 3 and bearing sleeve 4, in a corresponding bore situated in a thickend zone 11 of the mounting plate 1. At its end, the bearing projection 10 carries a drive pinion 12, fixed thereto rotationally keyed and axially immovable, which is intended for engaging into flexible drive elements toothed in the manner of toothed racks—so-called threaded cables—by means of which the adjustment movements are transmitted to the apparatus to be actuated.

Where the handwheel assembly is fitted to a component of bodywork, for example the forward, transverse component of the sliding roof frame, the mounting plate engages with a projection 13 situated in the region of the drive pinion 12 through a corresponding aperture in the bodywork and is fixed to the bodywork component, for example by screws, which are passed through fixing bores 14 of the mounting plate.

The externally visible parts of the handwheel 2 comprise a convex domed plate 14 and a peripheral rim 15, adjoining thereto with a transition radius, which rim, as can be seen in FIGS. 1 and 4, is equipped with finger depressions 16. The plate 14 and the rim 15 impart to the handwheel 2 a shell-like form, so that an internal space 17 (FIG. 2) is formed in the handwheel 2, which makes possible the housing of the described functional components of the drive, without however being completely filled with them.

Mounting plate 1 and handwheel 2 are each moulded from a suitable plastics material, which makes possible dimensionally stable, economical mass production.

The construction so far described of the handwheel assembly corresponds to the already known state of the art. Starting from this, the invention will now be described in more detail below.

The handwheel 2 is, in the example illustrated, moulded in one piece from a translucent plastics material, which may be rendered opaque by appropriate matting or the like. It is, however, also possible to form scattering prisms or the like by concentric grooves, depressions or the like moulded preferably on the inner face of the handwheel 2, which prisms ensure adequate scattering of the light passing through the handwheel 2, if the handwheel is made from a transparent plastics material.

In the example shown, two tubular lamps 18 and 19 are housed in the internal space 17 of the handwheel 2, as can be seen for example from FIG. 3. The tubular lamps 18, 19 are located in a symmetrical arrangement on either side of an imaginary central plane oriented perpendicularly to the mounting plate 1, in which plane also the axes of the bearing journal 3 and bearing sleeve 4 and of the bearing projection 10 of the gearwheel 9 are situated. This central plane is denoted in FIG. 3 by the reference 20. The tubular lamps 18 and 19 are oriented parallel to this central plane 20 and substantially parallel to the baseplate 1.

The central plane 20 extends also through the switch provided for actuating the incandescent lamps and referenced generally 21, which is situated diametrically opposite the gearwheel 9. The switch 21, situated on the mounting plate 1, and projecting with its actuating element 22 beyond the circumference of the handwheel 2, is explained in more detail below.

In the example shown, the mounting plate 1 is of an electrically nonconducting plastics material, which permits direct fitting of electrically conducting components to the mounting plate 1. The tubular lamps 18,19 are each held between contact clips 23 and 24, which are connected together in pairs by connecting strips 25 and 26, formed in one piece with the contact clips. The contact clips 23 and 24 are passed through corresponding slit-shaped openings in the mounting plate and fixed in this manner in their position. On the connecting strip 26, a spade terminal 27 for the cable connection is situated.

For explaining the switch 21, reference is now made basically to FIGS. 2 and 3. As is apparent therefrom, the actuating element 22 of the switch 21 is constructed essentially as a pivotal lever 28, which is situated on the side of the mounting plate 1 remote from the internal space 17 of the handwheel 2 and is pivotally journalled on this plate by means of a bearing pin 29, situated in the central plane 20, this pin being oriented with its axis parallel to the bearing journal 3. For the actuating element 22 and for the pivotal lever 28, three detent positions are provided, of which the central position shown in FIG. 3 is the nautral position O, whereas two lateral positions, indicated in FIG. 1 is dot-and-dash line, denote the switched-on position I and door contact position TK respectively.

The associated detent elements are apparent from FIG. 5 in conjunction with FIG. 3. The pivotal lever 28, which furthermore is constructed symmetrically with reference to the central plane 20, possesses in the vicinity of its bearing pin 29 a flat widened zone 30, in which a resilient detent tongue 32 is mounted in a cut-out 31, opposite to which tongue 3 detent depressions 33, 34 and 35, provided alongside one another in the mounting plate 1, are situated. The detent depression 33 corresponds to the switched-on position I, the detent position 34 denotes the neutral position O and the detent depression 35 corresponds to the door contact position TK, in which the tubular lamps 18, 19 are switched only when an automobile door is opened or closed respectively.

On the connecting strip 25, which is adjacent to the switch 21, there are situated in a symmetrical arrangement two resiliently removable switch contacts 36, and 37, which bear against the widened zone 30 of the pivotal lever 28, as can be seen from FIG. 3. The movable switch contacts 36 and 37 can be constructed in one piece with the connecting strip 25. Since the bearing pin 29 is situated centrally between the two movable switch contacts 36 and 37 and the detent depressions 33 to 35 are disposed at uniform spacing from one another, the pivotal lever 28 passes through equal angles of pivoting starting from its neutral position when it is pivoted into the two lateral switched positions.

As is apparent from FIG. 3, fixed switch contacts 38 and 39 are associated with the movable switch contacts 36 and 37, which (fixed contacts) are fixed directly to the mounting plate 1 by appropriate slit openings. In the neutral position shown in FIG. 3, the contact pairs 36, 38 and 37, 39 are without contact, i.e. spaced from one another. If, however, the actuating element 22 is operated and thereby the lever 28 is pivoted in one of the two directions, then one of the contact pairs 36, 38 or 37, 39 comes into electrically conducting contact, depending upon the direction of pivoting. The contact pair 36, 38 is here associated with the switched-on position I and the contact pair 37, 39 with the door contact position TK. On the fixed contacts 38 and 39, there are spade terminals 40, 41 respectively for the cable connection.

FIGS. 6 and 7 illustrate the housing both of the drive components and also of the lighting components inside the internal space 17 of the handwheel 2, not shown in these figures. It can be seen that the housing of the tubular lamps 18, 19 leads to a uniform illumination, especially if the handwheel 2 is constructed in the described manner as a light scattering screen. In FIGS. 6 and 7, the toothed rim of the gear wheel 9 is not illustrated, in order to simplify the drawing. The same applies for the teeth of the drive pinion 12 in FIG. 3. FIG. 7 shows the position of an electronic delay element 42, mounted on the mounting plate in the vicinity of the switch 21.

In FIGS. 8 and 9, the circuits of the electrical components of the handwheel assembly are shown schematically in circuit diagrams. FIG. 8 shows the circuit without an electronic delay element 42, whereas this element is present in FIG. 9. The contacts and spade terminals have been indicated in the circuit diagrams by the reference numerals used for them. As can be seen, the two incandescent lamps 18, 19 are permanently connected to the positive terminal, the electrical circuit being closed, according to the setting of the lever 28, either in the switched-on position via the fixed contact 38 or in the door contact position via the fixed contact 39. The two movable switch contacts 36 and 37 are illustrated in both diagrams schematically as one homogeneous contact. As can be seen from FIG. 9, the electronic delay element is located between the fixed switch contact 39 and the associated spade terminal 41.

We claim:

1. Rotatable hand actuating element for adjustment drives in automobiles, especially handwheel assembly for the actuation of sliding roofs, consisting of a shell-like handwheel equipped with a peripheral rim and an internally mounted, central bearing sleeve and of a mounting plate, towards which the open side of the handwheel faces and which rotatable journals the handwheel by means of a bearing journal extending into the bearing sleeve, an external set of teeth on the bearing sleeve being in engagement with a gearwheel rotatably mounted on the mounting plate, which is connected in rotationally locked manner with a drive pinion for drive elements transmitting the adjustment movement, wherein the handwheel possesses at least one wall surface translucent to light, opposite to which at least one incandescent lamp mounted between handwheel and mounting plate in the internal space of the handwheel is situated.

2. Apparatus according to claim 1, wherein the handwheel is moulded as a whole from a translucent material.

3. Apparatus according to claim 1 wherein the translucent wall surface of handwheel are made from a material rendered opaque.

4. Apparatus according to claim 1 wherein the translucent wall surface or handwheel are fitted with scattering prisms or the like.

5. Apparatus according to claim 1 wherein a switch for the incandescent lamp or lamps is mounted on the mounting plate.

6. Apparatus according to claim 1 wherein the switch projects with its actuating element beyond the circumference of the handwheel.

7. Apparatus according to claim 1 wherein the switch is situated diametrally opposite the gearwheel with respect to the handwheel, and that one incandescent lamp is provided in symmetrical arrangement on each side of the central place, oriented perpendicularly to the mounting plate and passing through the switch, the bearing sleeve and the gearwheel.

8. Apparatus according to claim 1 wherein tubular lamps are provided as incandescent lamps, these lamps being held in known manner between contact clips which are mounted electrically insulated on the mounting plate.

9. Apparatus according to claim 1 wherein the mounting plate is moulded from an electrically non-conducting plastics material and that the fixed switch contacts and the contact clips for the incandescent lamps are fixed directly to the mounting plate and are connected with spade terminals for the cable connection.

10. Apparatus according to claim 1 wherein two incandescent lamps are provided, their contact clips are connected together in pairs by connecting strips formed in one piece with the contact clips.

11. Apparatus according to claim 9 wherein on that connecting strip which is adjacent to the switch, two movable switch contacts are provided spaced apart, which can each be brought as desired by the actuating elements into electrically conducting contact with a fixed switch contact associated with each.

12. Apparatus according to claim 1, wherein the actuating elements is formed as a lever pivotal about a bearing journal oriented parallel to the bearing sleeve, the bearing journal of which lever, journalled on the mounting plate, is situated centrally between the two movable switch contacts.

13. Apparatus according to claim 1 wherein a detent tongue is mounted on that actuating element, which tongue is engaged as desired in one of three detent depressions situated adjacent to one another on the mounting plate, of which the central depression corresponds to the neutral position and the two lateral depressions each are associated with one switched position, in each of which one of the fixed switch contacts and one of the movable switch contacts are in electrically conducting contact.

14. Apparatus according to claim 1 wherein an already known electronic delay element, mounted on the mounting plate, is connected before the fixed switch contact associated with the door contact position of the actuating elements.

15. Apparatus according to claim 1 wherein the mounting plate is equipped, on its face towards the handwheel, at least in the zone of the incandescent lamps with a good reflective coating.

16. Apparatus according to claim 1 wherein the mounting plate is moulded as a whole from a light-coloured plastics material, possessing a good light reflection coefficient.

* * * * *